US009645014B2

(12) United States Patent
McMillan

(10) Patent No.: US 9,645,014 B2
(45) Date of Patent: May 9, 2017

(54) SYSTEM AND METHOD FOR PROVIDING SUPERVISORY CONTROL OF AN HVAC SYSTEM

(75) Inventor: Andrew Hamilton McMillan, Bedford, NY (US)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 756 days.

(21) Appl. No.: 14/005,891

(22) PCT Filed: Mar. 14, 2012

(86) PCT No.: PCT/IB2012/051193
§ 371 (c)(1),
(2), (4) Date: Sep. 18, 2013

(87) PCT Pub. No.: WO2012/137087
PCT Pub. Date: Oct. 11, 2012

(65) Prior Publication Data
US 2014/0010260 A1    Jan. 9, 2014

Related U.S. Application Data

(60) Provisional application No. 61/454,794, filed on Mar. 21, 2011, provisional application No. 61/468,732, filed on Mar. 29, 2011.

(51) Int. Cl.
*F24F 11/00*     (2006.01)
*G01K 3/10*     (2006.01)
(52) U.S. Cl.
CPC .............. *G01K 3/10* (2013.01); *F24F 11/006* (2013.01); *F24F 11/0086* (2013.01);
(Continued)

(58) Field of Classification Search
CPC ................. F24F 11/006; F24F 11/0086; F24F 2011/0064; F24F 11/0012; F24F 11/0001; G05D 23/1902
See application file for complete search history.

(56) References Cited

U.S. PATENT DOCUMENTS 4,172,555 A * 10/1979 Levine ...................... F23N 5/20
236/15 BG
4,891,953 A * 1/1990 Isono .................. F24F 11/0009
236/78 B (Continued)

*Primary Examiner* — Allana Lewin Bidder
*Assistant Examiner* — Kun Kai Ma

(57) ABSTRACT

A sensor surrogate (120) for causing a heating, ventilating, and air conditioning (HVAC) system (110) to maintain a desired room temperature, contains a temperature sensor (122) for determining an actual room temperature and logic embodied on at least one non-transitory computer readable medium (130). The logic (130) is configured to perform the steps of: calculating a current low temperature that is lower than a pre-programmed HVAC system temperature and providing the HVAC system with a first signal that represents the calculated current low temperature, if the desired temperature is above the pre-programmed HVAC system temperature; and calculating a current high temperature that is above the pre-programmed HVAC system temperature and providing the HVAC system (110) with a second signal that represents the calculated current high temperature, if the desired room temperature is below the pre-programmed HVAC system temperature.

17 Claims, 5 Drawing Sheets

(52) U.S. Cl.
CPC ............... *F24F 2011/0063* (2013.01); *F24F 2011/0064* (2013.01); *F24F 2011/0091* (2013.01)

(56) References Cited

U.S. PATENT DOCUMENTS

| | | | | |
|---|---|---|---|---|
| 4,894,999 | A * | 1/1990 | Kaiju | B60H 1/321 62/158 |
| 5,105,366 | A * | 4/1992 | Beckey | G05D 23/1931 165/224 |
| 5,262,758 | A * | 11/1993 | Nam | G01K 1/02 340/585 |
| 5,555,927 | A * | 9/1996 | Shah | G05D 23/1904 165/239 |
| 5,669,226 | A * | 9/1997 | Kurahashi | B60H 1/3205 236/78 D |
| 5,816,491 | A | 10/1998 | Berkeley | |
| 5,819,845 | A * | 10/1998 | Ryu | F24F 11/006 165/254 |
| 6,062,482 | A * | 5/2000 | Gauthier | F24F 11/006 165/267 |
| 6,213,404 | B1 | 4/2001 | Dushane | |
| 6,513,723 | B1 | 2/2003 | Mueller | |
| 6,860,431 | B2 | 3/2005 | Jayadev | |
| 8,019,477 | B2 * | 9/2011 | Bash | H05K 7/20836 62/177 |
| 2003/0109212 | A1 * | 6/2003 | Hayashi | B60H 1/00285 454/56 |
| 2003/0149539 | A1 * | 8/2003 | Kolk | G05D 23/1923 702/130 |
| 2003/0150925 | A1 * | 8/2003 | Archacki, Jr. | G05D 23/1904 236/46 R |
| 2005/0120012 | A1 | 6/2005 | Poth | |
| 2005/0126773 | A1 * | 6/2005 | Hashimoto | B60H 1/0075 165/204 |
| 2005/0161517 | A1 | 7/2005 | Helt | |
| 2008/0083834 | A1 * | 4/2008 | Krebs | B60H 1/00892 237/2 A |
| 2008/0191044 | A1 * | 8/2008 | Park | F24F 11/006 236/51 |
| 2008/0191045 | A1 * | 8/2008 | Harter | F24F 11/0012 236/91 D |
| 2009/0008467 | A1 * | 1/2009 | Ise | B60H 1/00735 237/2 A |
| 2010/0070093 | A1 * | 3/2010 | Harrod | F24F 11/0086 700/278 |
| 2010/0163633 | A1 | 7/2010 | Barrett | |
| 2010/0241287 | A1 * | 9/2010 | Nishino | F24F 3/065 700/300 |
| 2010/0243231 | A1 * | 9/2010 | Rosen | G05D 23/1904 165/237 |
| 2012/0067561 | A1 * | 3/2012 | Bergman | B60H 1/00657 165/257 |

\* cited by examiner

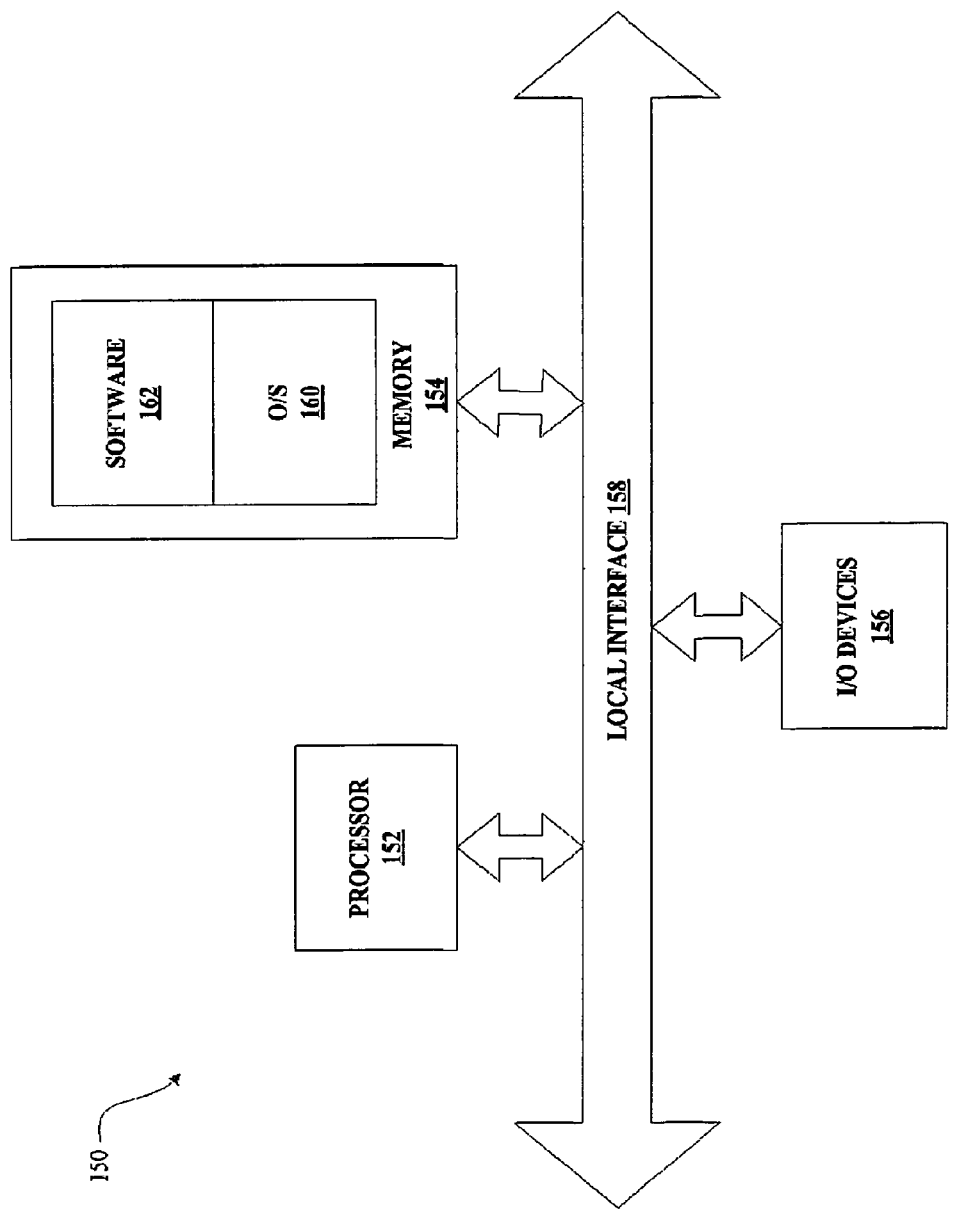

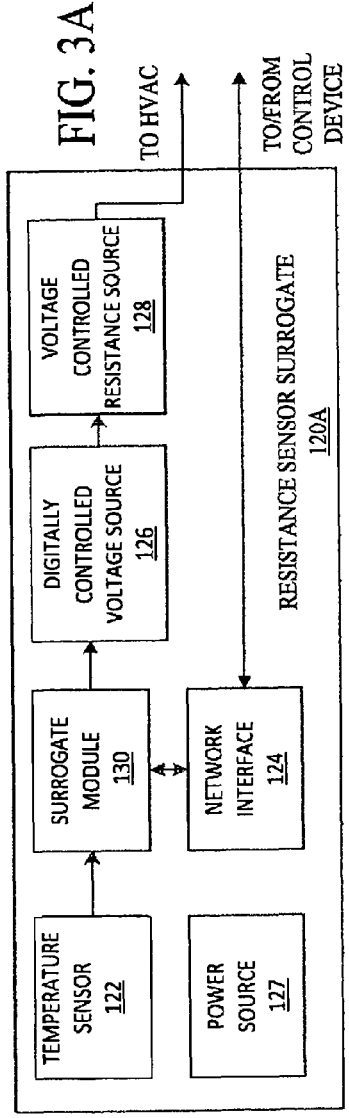
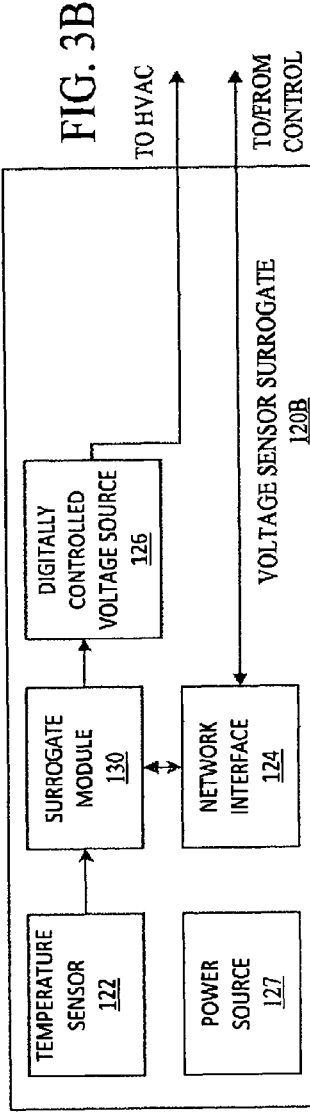
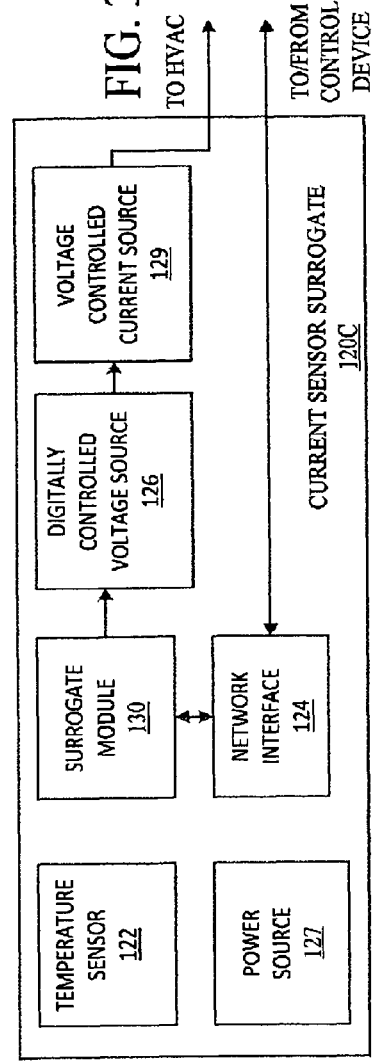

SYSTEM AND METHOD FOR PROVIDING SUPERVISORY CONTROL OF AN HVAC SYSTEM

TECHNICAL FIELD

The present invention is directed generally to control systems for heating, ventilating, and air conditioning (HVAC) systems. More particularly, various inventive methods and apparatus disclosed herein relate to providing supervisory control of an HVAC system without requiring a change to the HVAC system.

BACKGROUND

HVAC systems provide much needed climate control in buildings. To reduce the cost and energy usage of heating, cooling, and ventilating a space in commercial buildings, it is sometime useful to add supervisory control to an existing HVAC system. The supervisory control may be used, for example, to cause the HVAC system to use more energy efficient setpoints at certain times of day or when the space is unoccupied. The supervisory control may also be used to sequence the activation of multiple HVAC units in applications where there are multiple units and it is useful to limit peak electrical loads. Among other things, supervisory controls may also be used to test the HVAC equipment by forcing it into heating, cooling, or ventilation modes, while measuring the airflow or temperature of the air entering the space.

In many cases the existing HVAC system utilizes a simple temperature sensor to determine the temperature of the space. There are several common types of temperature sensors used including, but not limited to, devices whose: resistance varies with temperature, regardless of voltage and current; voltage varies with temperature, independent of current; and, current varies with temperature, independent of voltage.

In many applications existing HVAC systems do not provide an interface to communicate with a supervisory control system, so the existing HVAC system has to be replaced and/or reprogrammed in order to gain the benefits of supervisory control. Unfortunately, modification of a controller of the HVAC system to add such supervisory control requires a certain skill level, knowledge of building specifics, and/or knowledge of the particular HVAC system. Such skill level and knowledge comes at a significant financial cost.

Thus, there is a need in the art to provide a way to provide supervisory control of an HVAC system without requiring physical change to the HVAC control system or replacement of a current HVAC control system.

SUMMARY

Embodiments of the present invention provide a system and method for providing supervisory control of an HVAC system. Briefly described, in architecture, one embodiment of the system, among others, can be implemented as follows. The system contains at least one sensor surrogate and at least one controller. The sensor surrogate contains a temperature sensor for determining an actual room temperature and logic embodied on at least one non-transitory computer readable medium. The logic is configured to function in a first mode or in a second mode, wherein the first mode is characterized by the logic being configured to perform the steps of: if the desired temperature is above a pre-programmed HVAC system temperature, calculating a current low temperature that is lower than the pre-programmed HVAC system temperature and providing the HVAC system with a first signal that represents the calculated current low temperature; and if the desired temperature is below the pre-programmed HVAC system temperature, calculating a current high temperature that is above the pre-programmed HVAC system temperature and providing the HVAC system with a second signal that represents the calculated current high temperature. The second mode is characterized by the logic being configured to perform the step of providing a third signal that represents the actual room temperature. The system also contains a controller for instructing the at least one sensor to run in either the first mode or the second mode.

The present invention also provides a sensor surrogate for causing an HVAC system to maintain a desired room temperature. The sensor surrogate contains a temperature sensor for determining an actual room temperature and logic embodied on at least one non-transitory computer readable medium. The logic is configured to perform the steps of: if the desired room temperature is above a pre-programmed HVAC system temperature, calculating a current low temperature that is lower than the pre-programmed HVAC system temperature and providing the HVAC system with a first signal that represents the calculated current low temperature; and if the desired room temperature is below the pre-programmed HVAC system temperature, calculating a current high temperature that is above the pre-programmed HVAC system temperature and providing the HVAC system with a second signal that represents the calculated current high temperature.

The method for providing supervisory control of an HVAC system, comprises the steps of: determining an actual room temperature; determining if a desired room temperature is above a pre-programmed HVAC system temperature; if the desired room temperature is above the pre-programmed HVAC system temperature, calculating a current low temperature that is lower than the pre-programmed HVAC system temperature and providing the HVAC system with a first signal that represents the calculated current low temperature; and if the desired room temperature is below the pre-programmed HVAC system temperature, calculating a current high temperature that is above the pre-programmed HVAC system temperature and providing the HVAC system with a second signal that represents the calculated current high temperature.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 2 is a block diagram illustrating an example of the control device of FIG. 1, wherein the control device is a general purpose computer.

FIG. 3A is a block diagram illustrating a resistance sensor surrogate.

FIG. 3B is a block diagram illustrating a voltage sensor surrogate.

FIG. 3C is a block diagram illustrating a current sensor surrogate.

DETAILED DESCRIPTION

The present system and method provides for supervisory control of a previously installed HVAC system with minimal financial and labor cost, as well as without requiring modification of a controller of the HVAC system, without requiring reprogramming of the HVAC system, and without requiring replacement of the HVAC system.

The present invention introduces a sensor surrogate that replaces the temperature sensor of a room. The sensor surrogate stimulates the HVAC system into performing a desired behavior. Specifically, the sensor surrogate provides supervisory control of the HVAC system by adding logic for acting upon a detected actual temperature of the room and providing to the HVAC system a signal that causes the HVAC system to adjust or maintain temperature.

Figure 1:
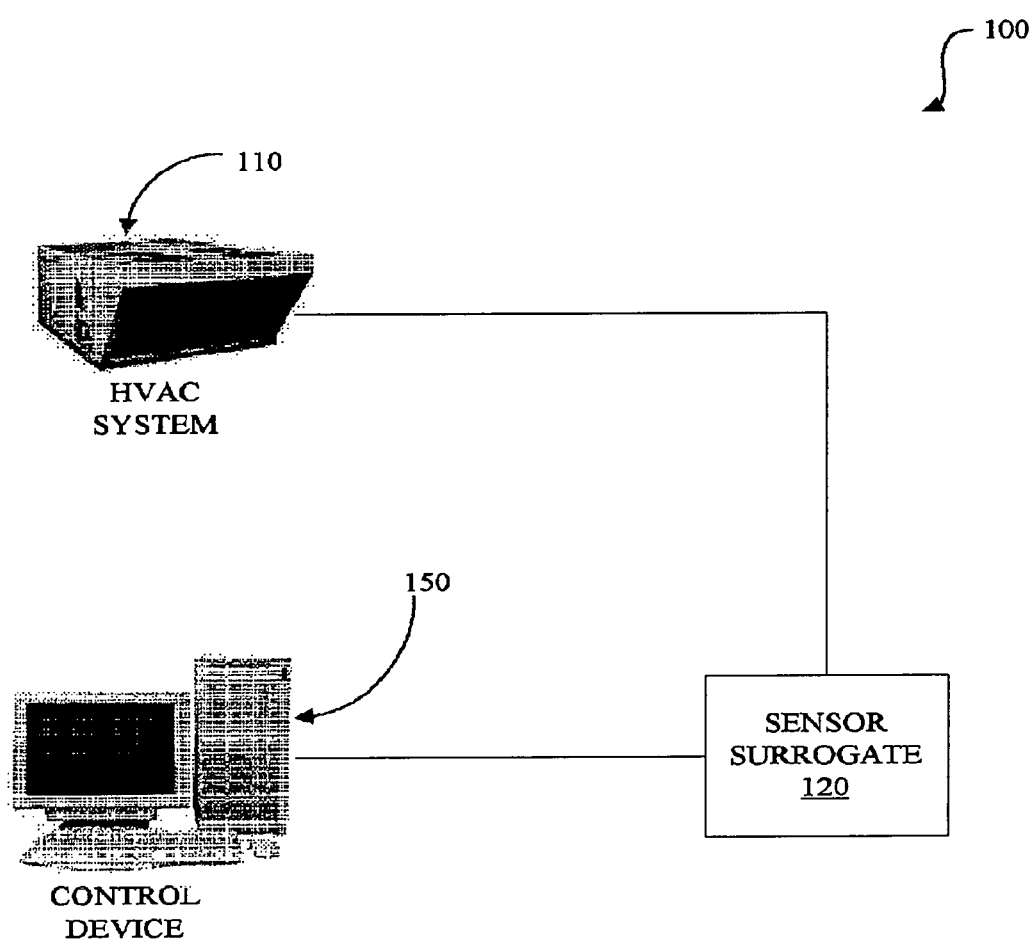
FIG. 1 is a schematic diagram illustrating a general network in which the present system and method for providing supervisory control of the HVAC system may be provided.

FIG. 1 is a schematic diagram illustrating a general network 100 in which the present system and method for providing supervisory control of the HVAC system may be provided. As shown by FIG. 1, the network 100 contains an HVAC system 110, a sensor surrogate 120, and a control device 150. It should be noted that although FIG. 1 illustrates a network 100 having a single HVAC system 110, a single sensor surrogate 120, and a single control device 150, the network 100 may instead have multiple HVAC systems 110, multiple sensor surrogates 120, and/or multiple control devices 150.

The HVAC system 110 may be any known HVAC system for supplying a room with air at a selected temperature and humidity. Of course, the HVAC system 110 may instead provide only temperature maintenance or only humidity maintenance. In addition, the HVAC system 110 may be a single packaged unit with integral control or a collection of equipment that has an external controller. Since one having ordinary skill in the art would know components of an HVAC system and how an HVAC system functions, further description of an HVAC system 110 is not provided herein. It should be noted that while the present description is provided with regard to a room, the present invention is not limited to monitoring and modifying room temperature and/or humidity. Instead, the room may be any space or area requiring monitoring and/or modification in temperature and/or humidity.

The sensor surrogate 120 is connected to the HVAC system 110 and simulates the actions of a room temperature sensor. There may be one or more sensor surrogates 120 within the network 100. As an example, there may be one sensor surrogate 120 placed in each room of a building for assisting with regulation of temperature within respective rooms. It should be noted that sensor surrogates 120 are described in further detail with regard to the description of FIG. 3 provided hereinafter.

The control device 150 communicates with the sensor surrogate 120, either through wired or wireless communication, providing a desired temperature to the sensor surrogate 120. For instance, a programmer of the control device 150 may specify different temperatures for different sensor surrogates 120 within the network 100. Such different temperatures may be for different periods of time as well, such as, but not limited to, per hour, per day, or per week. The control device 150 may be any device capable of allowing a user to program a temperature for each sensor surrogate 120 and capable of communicating the selected temperatures to the sensor surrogates 120. As an example, the control device 150 may be a general purpose computer or any device having at least a memory and a processor.

FIG. 2 is a block diagram illustrating an example of the control device 150 of FIG. 1, wherein the control device 150 is a general purpose computer. Generally, in terms of hardware architecture, as shown in FIG. 2, the control device 150 includes a processor 152, memory 154, and one or more input and/or output (I/O) devices 156 (or peripherals) that are communicatively coupled via a local interface 158. The local interface 158 can be, for example but not limited to, one or more buses or other wired or wireless connections, as is known in the art. The local interface 158 may have additional elements, which are omitted for simplicity, such as controllers, buffers (caches), drivers, repeaters, and receivers, to enable communications. Further, the local interface 158 may include address, control, and/or data connections to enable appropriate communications among the aforementioned components.

The processor 152 is a hardware device for executing software 162, particularly that stored in memory 154. The processor 152 can be any custom made or commercially available processor, a central processing unit (CPU), an auxiliary processor among several processors associated with the control device 150, a semiconductor based microprocessor (in the form of a microchip or chip set), a macroprocessor, or generally any device for executing software instructions provided by the software 162.

The memory 154 can include any one or combination of volatile memory elements (e.g., random access memory (RAM, such as DRAM, SRAM, SDRAM, etc.)) and nonvolatile memory elements (e.g., ROM, hard drive, tape, CDROM, DVD, etc.). Moreover, the memory 154 may incorporate electronic, magnetic, optical, and/or other types of storage media. Note that the memory 154 can have a distributed architecture, where various components are situated remote from one another, but can be accessed by the processor 152.

The software 162 in the memory 154 may include one or more separate programs, each of which contains an ordered listing of executable instructions for implementing logical functions. In the example of FIG. 2, the software 162 in the memory 154 of the control device 150 provides capability for assigning temperatures to sensor surrogates 120 (FIG. 1), in accordance with the present invention. As an example, the software 162 may define a graphical user interface (GUI) and associated functionality for allowing a user to designate specific sensor surrogates 120 and assign temperatures for each sensor surrogate 120.

A suitable operating system (O/S) 160 may also be provided within the memory 154. As is known by those having ordinary skill in the art, the operating system 160 essentially controls the execution of other computer programs of the control device 150, and provides scheduling, input-output control, file and data management, memory management, and communication control and related services.

The I/O devices 156 may include input devices, for example but not limited to, a keyboard, mouse, scanner, microphone, etc. Furthermore, the I/O devices 156 may also include output devices, for example but not limited to, a printer, display, etc. Finally, the I/O devices 156 may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the control device 150 is in operation, the processor 152 is configured to execute software 162 stored within the memory 154, to communicate data to and from the memory 154, and to generally control operations of the control device 150 pursuant to the software 162. The software 162 and O/S 160, in whole or in part, but typically the latter, are read by the processor 152, perhaps buffered within the processor 152, and then executed.

In an alternative embodiment, where the control device 150 is implemented in hardware, the control device 150 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It should be noted that in accordance with an alternative embodiment of the invention, the network 100 may instead exclude use of a control device 150. In such an embodiment, control features for the sensor surrogate 120 are instead provided by the sensor surrogate 120 itself. This alternative embodiment is described in further detail with regard to FIG. 3.

FIGS. 3A, 3B, and 3C (together referred to as FIG. 3) are block diagrams further illustrating three examples of the sensor surrogate 120 of FIG. 1. Of course, one having ordinary skill in the art would appreciate that additional examples of the sensor surrogate 120 may be provided in accordance with the present description, based on the type of temperature sensor replaced by the sensor surrogate 120.

The present description provides for three exemplary embodiments of the present system and method. The first and second embodiments require knowledge of the temperature that the HVAC system 110 is pre-programmed to maintain, while the third embodiment of the sensor surrogate 120 does not require knowledge of the HVAC system 110 pre-programmed temperature.

FIG. 3A is a block diagram illustrating a resistance sensor surrogate 120A, in accordance with the first exemplary embodiment of the invention. The resistance sensor surrogate 120A replaces a temperature sensor in a room, where the temperature sensor being replaced has a resistance output vary with room temperature change. The resistance sensor surrogate 120A contains a temperature sensor 122 for determining a temperature of a room in which the resistance sensor surrogate 120A is located. The temperature sensor 122 provides a detected temperature to a surrogate module 130 located within the resistance sensor surrogate 120A. The surrogate module 130 provides the functionality performed by the resistance sensor surrogate 120A as is described in further detail hereinbelow with regard to FIG. 5.

Figure 4:
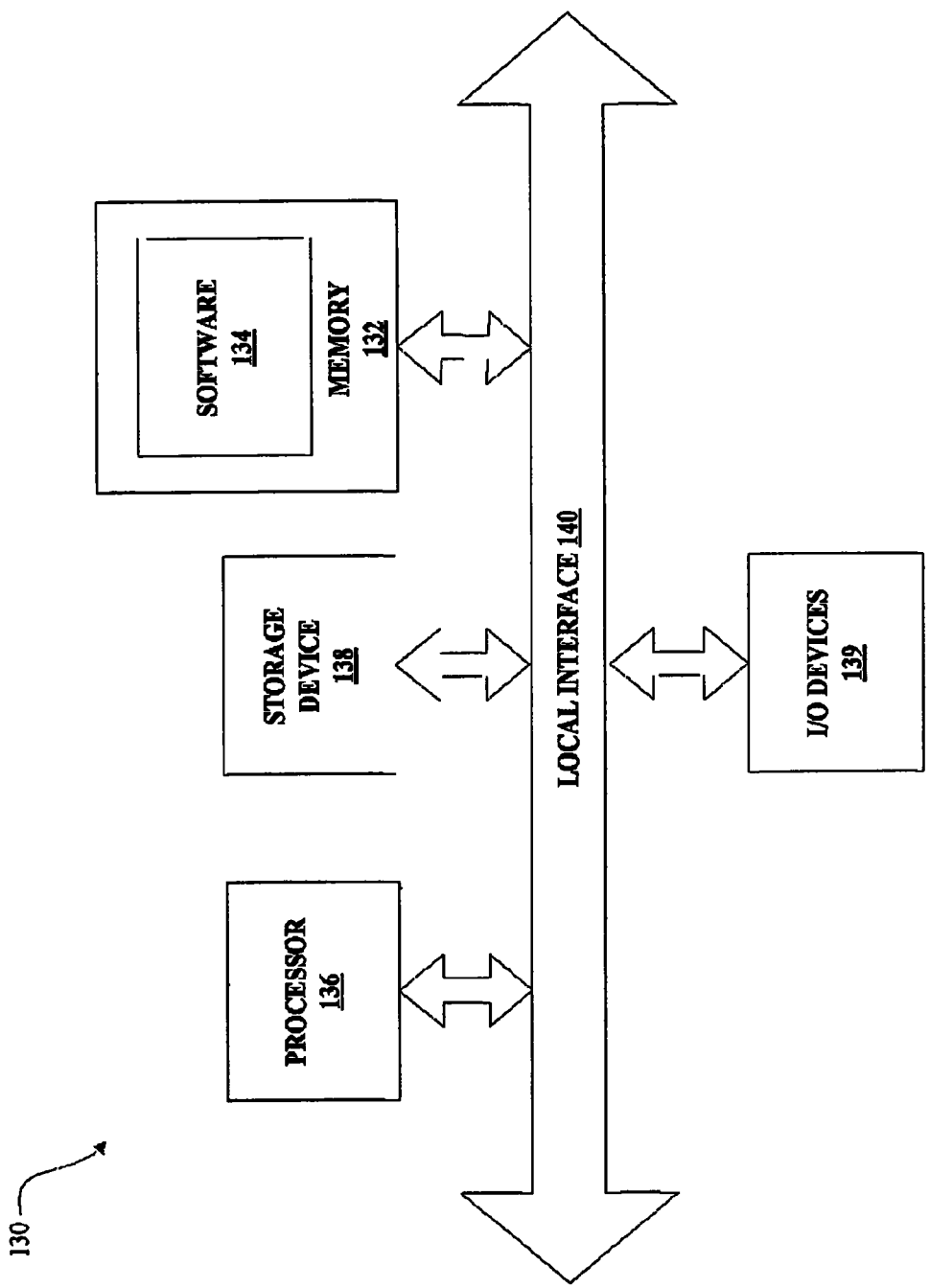
FIG. 4 is a block diagram providing an example of a surrogate module.

The surrogate module 130 may contain logic similar to a computer. An example of a surrogate module 130 is provided by the block diagram of FIG. 4. Referring to FIG. 4, the surrogate module 130 contains a memory 132 having software 134 therein, a processor 136, a storage device 138, and a local interface 140. Input and/or output (I/O) devices 139 (or peripherals) may be connected to the surrogate module 130, such as, for example, the temperature sensor 122, which provides detected temperatures to the surrogate module 130.

In the example of FIG. 4, the software 134 in the memory 132 provides for either forwarding of a signal representing current room temperature or creating of a customized signal representing a modification to current room temperature, in accordance with the present invention. A detailed description of a process for creating the customized signal is provided by the flowchart of FIG. 5.

Returning to FIG. 3A, the resistance sensor surrogate 120A also contains a network interface 124 for allowing communication between the surrogate module 130 and the control device 150 (FIG. 2). A digitally controlled voltage source 126 may be located within the resistance sensor surrogate 120A for receiving the signal from the surrogate module 130 and converting the signal from a digital signal to an analog signal. The analog signal from the digitally controlled voltage source 126 is received by a voltage controlled resistance source 128 for converting the analog signal into a resistance for outputting to the HVAC system 110.

FIG. 3B is a block diagram illustrating a voltage sensor surrogate 120B, in accordance with the first exemplary embodiment of the invention. The voltage sensor surrogate 120B replaces a temperature sensor in a room, where the temperature sensor being replaced has a voltage output vary with room temperature change. The voltage sensor surrogate 120B contains logic that is similar to the resistance sensor surrogate 120A, wherein such similar logic is designated by the same numbers as such logic in FIG. 3A.

The voltage sensor surrogate 120B contains a temperature sensor 122 for determining a temperature of a room in which the voltage sensor surrogate 120B is located. The temperature sensor 122 provides a detected temperature to a surrogate module 130 located within the voltage sensor surrogate 120B. The surrogate module 130 provides the functionality performed by the voltage sensor surrogate 120B as is described in further detail hereinbelow with regard to FIG.

5. The surrogate module 130 may contain logic similar to a computer, an example which was provided by FIG. 4.

The voltage sensor surrogate 120B also contains a network interface 124 for allowing communication between the surrogate module 130 and the control device 150 (FIG. 2). A digitally controlled voltage source 126 may be located within the voltage sensor surrogate 120B for receiving the signal from the surrogate module 130 and converting the digital signal to an analog signal for outputting to the HVAC system 110.

FIG. 3C is a block diagram illustrating a current sensor surrogate 120C, in accordance with the first exemplary embodiment of the invention. The current sensor surrogate 120C replaces a temperature sensor in a room, where the temperature sensor being replaced has a current output vary with room temperature change. The current sensor surrogate 120C contains logic that is similar to the resistance sensor surrogate 120A, wherein such similar logic is designated by the same numbers as such logic in FIG. 3A.

The current sensor surrogate 120C contains a temperature sensor 122 for determining a temperature of a room in which the current sensor surrogate 120C is located. The temperature sensor 122 provides a detected temperature to a surrogate module 130 located within the current sensor surrogate 120C. The surrogate module 130 provides the functionality performed by the current sensor surrogate 120C as is described in further detail hereinbelow with regard to FIG. 5. The surrogate module 130 may contain logic similar to a computer, an example which was provided by FIG. 4.

The current sensor surrogate 120C also contains a network interface 124 for allowing communication between the surrogate module 130 and the control device 150 (FIG. 2). A digitally controlled voltage source 126 may be located within the current sensor surrogate 120C for receiving the signal from the surrogate module 130 and converting the signal from a digital signal to an analog signal. The analog signal is received by a voltage controlled current source 129, which converts the analog signal into a current for outputting to the HVAC system 110.

As shown by FIGS. 3A, 3B, and 3C, each sensor surrogate 120 also contains a power source 127. The power source 127 may be one or more of many different categories of power sources. As an example, the power source 127 may be an internal power source, such as a battery power source. In addition, the power source 127 may be a remote source of power that provides power to the sensor surrogate 120 upon connection or communication with the power source 127. Such a remote source of power may be power provided by an HVAC system interface or a power supply from a building. In addition, the power source 127 may scavenge power from the environment, such as receiving power from light, or another energy source.

It should be noted that in accordance with the alternative embodiment of the invention in which the network does not contain a control device 150, the sensor surrogate 120 may instead contain input and/or output devices. An input device provided on the sensor surrogate 120, such as, for example, but not limited to, a key pad, would allow a user to program the sensor surrogate 120 with a desired temperature. In addition, an output device, such as, for example, but not limited to, a display, would allow a user to view the desired temperature entered.

Figure 5:
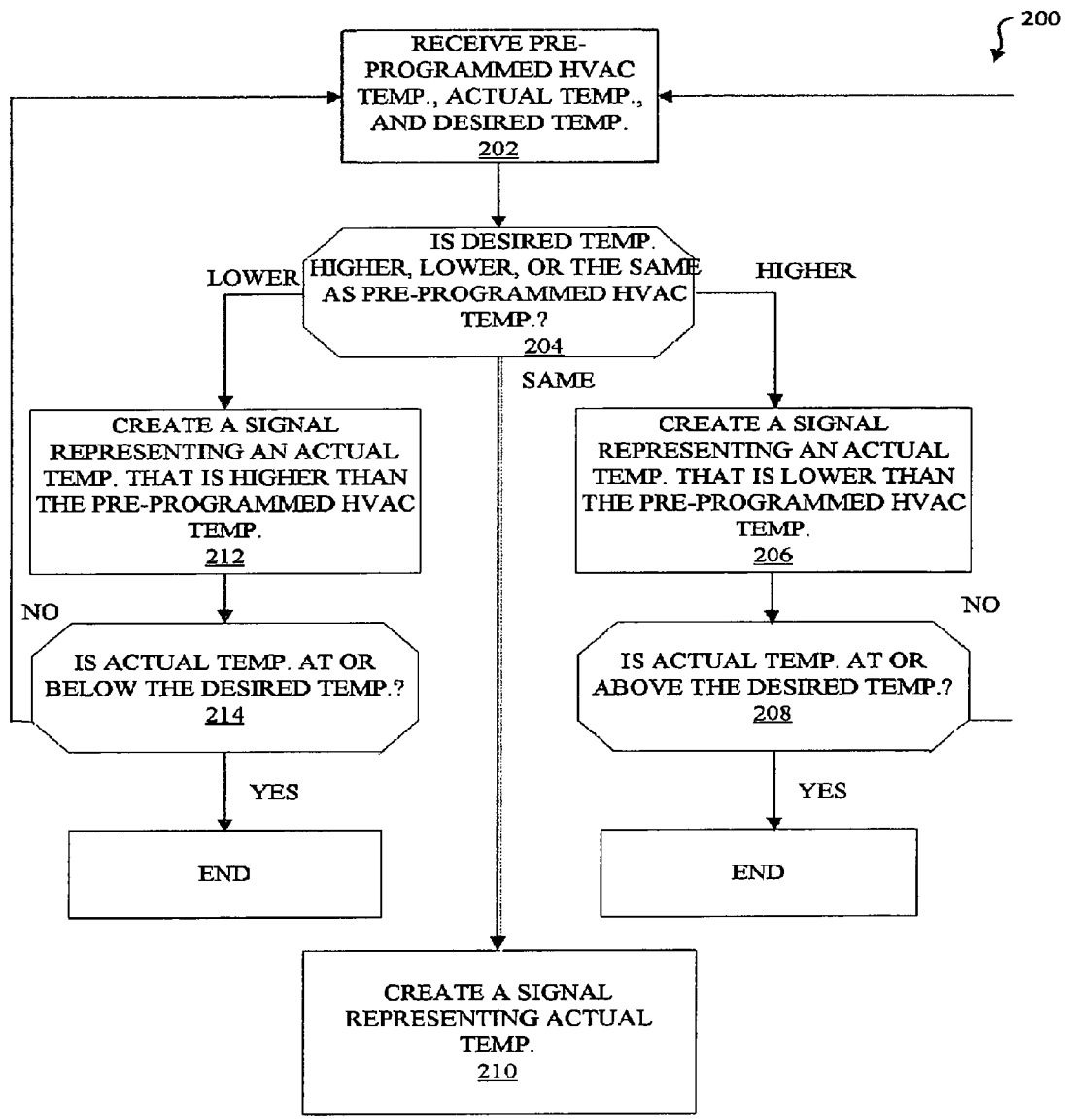
FIG. 5 is a flow chart providing a detailed illustration of a process performed by the surrogate module of FIG. 4 for creating a customized signal.

FIG. 5 is a flow chart 200 providing a detailed illustration of a process performed by the surrogate module 130 for creating the customized signal referred to in the description of FIGS. 3A, 3B, and 3C, in accordance with the first exemplary embodiment of the invention. It should be noted that any process descriptions or blocks in flow charts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

As shown by block 202, the surrogate module 130 receives an HVAC system pre-programmed temperature, an actual room temperature, and a desired room temperature. In accordance with the first exemplary embodiment of the invention, the HVAC system pre-programmed temperature may be stored within the storage device 138 of the surrogate module 130, while the desired room temperature may be received from the control device 150. It should be noted that in accordance with an alternative embodiment of the invention, where the network 100 does not include a control device 150, the desired room temperature may instead be programmed directly into the sensor surrogate 120 via, for example, touch entry buttons, or any other method of entering the desired temperature.

As shown by block 204, the surrogate module 130 determines if the desired temperature is higher, lower, or the same as the pre-programmed HVAC system temperature. If the desired room temperature is higher than the pre-programmed HVAC system temperature, the surrogate module 130 creates a signal representing an actual temperature that is lower than the pre-programmed HVAC system temperature (block 206). It should be noted that through the sensor surrogate 120 this signal is provided to the HVAC system 110, causing the HVAC system 110 to function as if the actual temperature were below the pre-programmed HVAC system temperature. This process is continued until the actual temperature in the room is at or above the desired temperature (block 208).

When the actual temperature of the room is the same as the desired temperature, the surrogate module 130 creates a signal representing an actual temperature that is the same as the pre-programmed HVAC system temperature. In addition, when the actual temperature of the room is above the desired temperature, the surrogate module 130 creates a signal representing an actual temperature that is above the pre-programmed HVAC system temperature.

If the desired temperature is the same as the pre-programmed HVAC system temperature, the surrogate module 130 creates a single representing an actual temperature that is the same as the pre-programmed HVAC system temperature (block 210). Through the sensor surrogate 120 this signal is provided to the HVAC system 110, causing the HVAC system 110 to function as if the actual temperature were the same as the pre-programmed HVAC system temperature.

If the desired temperature is lower than the pre-programmed HVAC system temperature, the surrogate module 130 creates a signal representing an actual temperature that is higher than the pre-programmed HVAC system temperature (block 212). Through the sensor surrogate 120 this signal is provided to the HVAC system 110, causing the HVAC system 110 to function as if the actual temperature were above the pre-programmed HVAC system temperature. This process is continued until the actual temperature in the room is at or below the desired temperature (block 214).

When the actual temperature of the room is the same as the desired temperature, the surrogate module 130 creates a signal representing an actual temperature that is the same as the pre-programmed HVAC system temperature. In addition, when the actual temperature of the room is below the desired temperature, the surrogate module 130 creates a signal representing an actual temperature that is below the pre-programmed HVAC system temperature.

In accordance with the second exemplary embodiment of the invention, the surrogate module 130 determines the difference in temperature between the desired temperature and the pre-defined HVAC system temperature. This difference in temperature is the amount higher or lower that the surrogate module 130 uses in creating a signal representing an actual temperature that is higher or lower than the pre-programmed HVAC signal temperature. As an example, if the desired temperature is lower than the pre-programmed HVAC system temperature, the surrogate module 130 determines the difference in temperature between the desired temperature and the pre-programmed HVAC system temperature. The surrogate module 130 then creates a signal representing an actual temperature that is higher than the pre-programmed HVAC system temperature by the determined difference. Through the sensor surrogate 120 this signal is provided to the HVAC system 110, causing the HVAC system 110 to function as if the actual temperature were above the pre-programmed HVAC system temperature.

In accordance with the third exemplary embodiment of the invention, the HVAC system temperature is learned by the surrogate sensor 120. Specifically, there may be circumstances in which the pre-programmed HVAC system temperature is not known. In such instances, the temperature sensor 122 and surrogate module 130 of the surrogate sensor 120 may work together to learn the temperature maintained within the room in which the surrogate sensor 120 is located. Such learning may take place over any time period, such as, but not limited to, a week or a month.

During the learning period, the surrogate module 130 receives temperature readings from the temperature sensor 122 and stores the same within the storage device 138 of the surrogate module 130. After monitoring temperatures for the learning period, the surrogate module 130 uses the learned temperatures as the pre-programmed HVAC system temperatures.

The following describes examples of modes of use in which the sensor surrogate 120 may be provided, namely, a night setback mode, a non-occupied setback mode, an equipment sequence management mode, and a demand response mode.

Night Setback Mode

One way of reducing energy use is to change the space temperature setpoint (desired temperature) during night hours. To accomplish this, the control device 150 instructs the sensor surrogates 120 to continuously provide an output that is offset from the actual temperature by the amount and direction of a desired setback, wherein the setback is the difference between the desired temperature and the pre-programmed HVAC system temperature. As previously mentioned, the HVAC system 110 uses the sensor surrogate 120 outputs to determine heating and cooling requirements so the result is a change in the actual room temperature with no change in the pre-programmed HVAC system temperature. For example, if the goal is to raise the setpoint on a summer evening from 72 degrees to 85 degrees, each sensor surrogate 120 is instructed to maintain its output at the actual room temperature minus 13 degrees. So, when the room temperature is 80 degrees, the HVAC system 110 will read the sensor surrogate 120 and interpret the result to mean that the room is only 67 degrees, and therefore will not activate the cooling.

Non-Occupied Setback Mode

Another way of reducing energy use is to change the room temperature setpoint (desired temperature) during times when the room is not occupied. To accomplish this, the control device 150 is provided with information regarding the occupied status of the room in which temperature is being monitored. This can be accomplished through occupancy sensors connected to the control device 150. Information regarding occupancy sensors can be communicated from other devices connected to occupancy sensors or the control device 150 can receive information about schedule occupancy from some other applications. When the room is not occupied, or scheduled to be non-occupied, the control device 150 instructs the sensor surrogates 120 to continuously provide an output that is offset from the actual room temperature by the amount and direction of the desired setback, wherein the setback is the difference between the desired temperature and the pre-programmed HVAC system temperature.

The HVAC system 110 uses the sensor surrogate outputs to determine the heating and cooling requirements so the result is a change in the actual room temperature with no change in the pre-defined HVAC system temperature. For example, if the goal is to lower the setpoint (desired temperature) from 68 degrees to 58 degrees on a winter afternoon when no classes are scheduled in a school room, each sensor surrogate 120 is instructed to maintain its output at the actual room temperature plus 10 degrees. So, when the room temperature is 60 degrees, the HVAC system 110 will read the sensor surrogate 120 and interpret the result to mean that the room is at 70 degrees and therefore will not activate the heating.

Equipment Sequence Management

To avoid energy utilization peaks it may be useful to sequence portions of the HVAC system 110 from one setpoint (desired temperature) to another such as when a building is going from non-occupied to occupied in the morning. The present system and method can accomplish this by instructing the sensor surrogates 120 to change from setback mode to normal mode in a timed sequence rather than all at once, effectively accomplishing the desired sequencing for the HVAC system 110.

Demand Response

Another supervisory control function is to reduce energy utilization in response to a "demand response event" declared by the utility (or other grid related entity). This invention enables demand response functionality as long as the control device 150 has a means to determine the initiation and conclusion of a demand-response event. This can be accomplished by a direct communication link between the control device 150 and the utility, a user input to the control device 150 or a communication from some other device that has access to the demand response initiation and conclusion information. When the control device 150 is informed of the initiation of a demand response event it instructs the sensor surrogates to enter the setback mode with a temperature offset value consistent with the degree of energy saving desired. When the control device 150 is informed of the conclusion of a demand response event it instructs the sensor surrogates to enter the normal mode.

It should be noted that for purposes of explanation, the abovementioned description refers to target temperatures, however, as is known by those having ordinary skill in the art, actual target temperatures are typically implemented as represented by ranges to provide a hysteresis.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Reference numerals appearing in the claims between parentheses, if any, are provided merely for convenience and should not be construed as limiting in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The invention claimed is:

1. A sensor surrogate for causing a heating, ventilating, and air conditioning (HVAC) system to maintain a desired room temperature, wherein the sensor surrogate comprises:
   a temperature sensor for determining an actual room temperature; and
   a logic embodied on at least one non-transitory computer readable medium configured to perform the steps of:
   if the desired room temperature is above a pre-programmed HVAC system temperature, calculating a current low temperature that is lower than the pre-programmed HVAC system temperature and providing the HVAC system with a first signal that represents the calculated current low temperature thereby causing the HVAC system to function as if the actual room temperature were below the pre-programmed HVAC system temperature; and
   if the desired room temperature is below the pre-programmed HVAC system temperature, calculating a current high temperature that is above the pre-programmed HVAC system temperature and providing the HVAC system with a second signal that represents the calculated current high temperature thereby causing the HVAC system to function as if the actual room temperature were above the pre-programmed HVAC system temperature.

2. The sensor surrogate of claim 1, wherein the step of calculating the current low temperature further comprises the steps of:
   determining a difference in temperature between the desired room temperature and the pre-programmed HVAC system temperature; and subtracting the difference from the actual room temperature, resulting in the current low temperature.

3. The sensor surrogate of claim 1, wherein the step of calculating the current high temperature further comprises the steps of:
  determining a difference in temperature between the desired room temperature and the pre-programmed HVAC system temperature; and
  adding the difference to the actual room temperature, resulting in the current high temperature.

4. The sensor surrogate of claim 1, wherein the logic is further configured to learn the pre-programmed HVAC system temperature over a period of time.

5. The sensor surrogate of claim 1, further comprising an input device for allowing a user to input the desired room temperature, and wherein the logic is further configured to receive the desired room temperature from the input device.

6. The sensor surrogate of claim 1, wherein an output of the sensor surrogate is selected from a group consisting of a voltage, a resistance, and a current.

7. A system for causing a heating, ventilating, and air conditioning (HVAC) system to maintain a desired temperature, wherein the system comprises: at least one sensor surrogate comprising:
  a temperature sensor for determining an actual room temperature; and
  a logic embodied on at least one non-transitory computer readable medium configured to function in a first mode or in a second mode, wherein the first mode is characterized by the logic being configured to perform the steps of:
    if the desired temperature is above a pre-programmed HVAC system temperature, calculating a current low temperature that is lower than the pre-programmed HVAC system temperature and providing the HVAC system with a first signal that represents the calculated current temperature thereby causing the HVAC system to function as if the actual room temperature were below the pre-programmed HVAC system temperature; and
    if the desired temperature is below the pre-programmed HVAC system temperature, calculating a current high temperature that is above the pre-programmed HVAC system temperature and providing the HVAC system with a second signal that represents the calculated current high temperature thereby causing the HVAC system to function as if the actual room temperature were above the pre-programmed HVAC system temperature, and
  wherein the second mode is characterized by the logic being configured to perform the step of providing a third signal that represents the actual room temperature; and
  a controller for instructing the at least one sensor surrogate to run in either the first mode or the second mode.

8. The system of claim 7, wherein the controller communicates with the at least one sensor surrogate through wireless communication.

9. The system of claim 7, wherein the controller communicates with the at least one sensor surrogate through wired communication.

10. The system of claim 7, wherein the step of calculating the current low temperature further comprises the steps of:
  determining a difference in temperature between the desired room temperature and the pre-programmed HVAC system temperature; and
  subtracting the difference from the actual room temperature, resulting in the current low temperature.

11. The system of claim 7, wherein the step of calculating the current high temperature further comprises the steps of:
  determining a difference in temperature between the desired room temperature and the pre-programmed HVAC system temperature; and
  adding the difference to the actual room temperature, resulting in the current high temperature.

12. The system of claim 7, wherein the logic is further configured to learn the pre-programmed HVAC system temperature over a period of time.

13. The system of claim 7, wherein the sensor surrogate further comprises an input device for allowing a user to input the desired room temperature, and wherein the logic is further configured to receive the desired room temperature from the input device.

14. The system of claim 7, wherein an output of the sensor surrogate is selected from a group consisting of a voltage, a resistance, and a current.

15. A method for causing a heating, ventilating, and air conditioning (HVAC) system to maintain a desired room temperature, wherein the method comprises the steps of:
  determining an actual room temperature;
  determining if the desired room temperature is above a pre-programmed HVAC system temperature;
  if the desired room temperature is above the pre-programmed HVAC system temperature, calculating a current low temperature that is lower than the pre-programmed HVAC system temperature and providing the HVAC system with a first signal that represents the calculated current temperature thereby causing the HVAC system to function as if the actual room temperature were below the pre-programmed HVAC system temperature; and
  if the desired room temperature is below the pre-programmed HVAC system temperature, calculating a current high temperature that is above the pre-programmed HVAC system temperature and providing the HVAC system with a second signal that represents the calculated current high temperature thereby causing the HVAC system to function as if the actual room temperature were above the pre-programmed HVAC system temperature.

16. The method of claim 15, wherein the step of calculating the current low temperature further comprises the steps of:
  determining a difference in temperature between the desired room temperature and the pre-programmed HVAC system temperature; and
  subtracting the difference from the actual room temperature, resulting in the current low temperature.

17. The method of claim 15, wherein the step of calculating the current high temperature further comprises the steps of:
  determining a difference in temperature between the desired room temperature and the pre-programmed HVAC system temperature; and
  adding the difference to the actual room temperature, resulting in the current high temperature.

* * * * *